United States Patent
Dahl et al.

(10) Patent No.: US 9,201,545 B2
(45) Date of Patent: *Dec. 1, 2015

(54) MOTION FEEDBACK

(71) Applicant: Elliptic Laboratories AS, Oslo (NO)

(72) Inventors: Tobias Gulden Dahl, Oslo (NO); Bjorn Cato Syversrud, Oslo (NO); Tom Øystein Kavli, Nittedal (NO); Erik Forsström, Oslo (NO); David Vågenes, Sandnes (NO)

(73) Assignee: Elliptic Laboratories AS, Oslo (NO)

( * ) Notice: Subject to any disclaimer, the term of this patent is extended or adjusted under 35 U.S.C. 154(b) by 154 days.

This patent is subject to a terminal disclaimer.

(21) Appl. No.: 13/781,527

(22) Filed: Feb. 28, 2013

(65) Prior Publication Data

US 2013/0176258 A1 Jul. 11, 2013

Related U.S. Application Data

(63) Continuation of application No. PCT/GB2011/051645, filed on Sep. 1, 2011.

(30) Foreign Application Priority Data

Sep. 2, 2010 (GB) .................................. 1014594.4
Jan. 6, 2011 (GB) .................................. 1100151.8

(51) Int. Cl.
*G09G 5/00* (2006.01)
*G06F 3/042* (2006.01)
(Continued)

(52) U.S. Cl.
CPC ............. *G06F 3/0421* (2013.01); *G01S 7/5273* (2013.01); *G06F 3/016* (2013.01); *G06F 3/017* (2013.01); *G06F 3/043* (2013.01)

(58) Field of Classification Search
CPC ... G06F 3/016; G06F 2203/014; G06F 3/011; G06F 3/017; G06F 3/0421; G06F 3/042; G06F 3/167; H01H 2003/008; H04N 21/42201; H04N 1/00411; H04N 1/00307; H04N 9/3194; Y10S 715/978
USPC .................... 345/156–184; 178/18.01–20.04; 715/863; 340/407.1
See application file for complete search history.

(56) References Cited

U.S. PATENT DOCUMENTS 6,078,308 A * 6/2000 Rosenberg et al. ........... 715/856
6,144,366 A * 11/2000 Numazaki et al. ............ 345/156
(Continued)

FOREIGN PATENT DOCUMENTS

WO 2006/067436 6/2006
WO 2009/115799 9/2009
(Continued)

OTHER PUBLICATIONS

Search Report dated Nov. 9, 2011 from International Application No. PCT/GB2011/051645.
(Continued)

*Primary Examiner* — Kent Chang
*Assistant Examiner* — Gerald Oliver
(74) *Attorney, Agent, or Firm* — Beyer Law Group LLP (57) ABSTRACT

A user input to a system is processed by receiving reflections of signals from a moving input object. Information relating to the direction of movement of the input object and information relating to the speed of the input object are determined from the reflections. Continual sensory feedback is provided to the user, controlled by a parameter that is repeatedly updated based on the direction and speed of the input object. When no new determination of information relating to the speed or direction of the input object has been made since a previous update, a time-dependent change is made to the parameter.

27 Claims, 2 Drawing Sheets

(51) Int. Cl.
*G01S 7/527* (2006.01)
*G06F 3/01* (2006.01)
*G06F 3/043* (2006.01)

(56) References Cited

U.S. PATENT DOCUMENTS

| | | | |
|---|---|---|---|
| 7,324,087 B2 * | 1/2008 | Iijima | 345/157 |
| 2006/0161871 A1 * | 7/2006 | Hotelling et al. | 715/863 |
| 2007/0211023 A1 * | 9/2007 | Boillot | 345/156 |
| 2009/0219251 A1 * | 9/2009 | Jung et al. | 345/170 |
| 2010/0188337 A1 * | 7/2010 | Westphal | 345/166 |
| 2011/0093812 A1 * | 4/2011 | Fong | 715/810 |
| 2011/0096954 A1 * | 4/2011 | Dahl | 382/103 |
| 2012/0017147 A1 * | 1/2012 | Mark | 715/702 |
| 2012/0218179 A1 * | 8/2012 | Oba et al. | 345/156 |

FOREIGN PATENT DOCUMENTS

| | | |
|---|---|---|
| WO | 2009/122193 | 10/2009 |
| WO | 2009/147398 | 12/2009 |
| WO | 2010/028399 | 3/2010 |

OTHER PUBLICATIONS

Written Opinion dated Mar. 14, 2013 from International Application No. PCT/GB2011/051645.

* cited by examiner

MOTION FEEDBACK

This Application is a Continuation of International Application No. PCT/GB2011/051645 filed Sep. 1, 2011, which claims benefit of priority to GB 1014594.4 filed Sep. 2, 2010 and GB 1100151.8 filed Jan. 6, 2011, all of which are hereby incorporated by reference.

This invention relates to methods and systems for processing a user input while providing sensory feedback.

Touch-screen electronic devices are becoming increasingly popular. Devices typically comprise a dense network of sensing regions across the display screen which can detect the precise position of a user's finger at all times.

Touchless user input systems are known that analyse reflections of electromagnetic or acoustic signals off a moving input object, such as a human hand or a stylus, in order to allow motion-based control of a system or device. Some approaches attempt to mimic touch-screens by tracking the position of an input object accurately in two or three dimensions, for example, in order to enable motion-based control of an on-screen cursor as described, for example, in WO 2006/067436. However, precise tracking is computationally intensive, requiring powerful processing capabilities, and can suffer from inaccuracies. It is therefore not well suited to portable devices such as mobile telephones which have limited processing and power constraints.

Alternative approaches use less precise motion detection methods to identify and respond to input gestures, without necessarily requiring the computationally-intensive step of robustly tracking the exact position of the input object. Identifying a gesture, rather than attempting fine tracking, enables signal processing to be performed at lower update rates, and with lower precision. WO 2009/115799 describes one such approach that can be used to detect specific types of movement, such as a gesture of a human hand, as inputs to a system.

The Applicant has realised, however, that it can be difficult for a user to interact with such gesture-based touchless input systems. The user may, for example, perform a gesture outside the detection range for the system, to which the system will not respond. Alternatively, the user might perform the gesture in detection range, but without sufficient accuracy or clarity for the gesture to be classified correctly by the system, either causing the system to do nothing or to invoke a function other than that intended by the user. In all these cases, the user can be left confused and frustrated.

To give a concrete example, a digital photo frame might be configured so that when a viewer sweeps his hand in a horizontal left-to-right motion within a designated area of the screen, the displayed photo changes to the next in sequence. However, a user, intending to change the photo, might correctly start the horizontal gesture, but inadvertently deviate into a predominantly vertical movement of the hand, before the horizontal gesture has been recognised by the photo frame. Either the photo frame might fail to identify any input and therefore not respond at all, or it might misrecognise the gesture as a vertical sweep and perform some unrelated function, such as displaying a menu of options. In either case, the user's input gesture does not lead to the anticipated behaviour of the photo changing.

The present invention seeks to overcome such shortcomings of known user input systems.

From a first aspect the invention provides a method of processing a user input to a system comprising:
  receiving reflections of signals from a moving input object;
  repeatedly determining information relating to the direction of movement of the input object from said reflections;
  repeatedly determining information relating to the speed of the input object from said reflections;
  providing continual or continuous sensory feedback to the user, controlled by a parameter;
  repeatedly updating the parameter by means of an algorithm that takes, as two variable inputs, the information relating to the direction of movement of the input object, and the information relating to the speed of the input object; and
  applying a time-dependent change to the parameter when no new determination of information relating to the speed or direction of movement of the input object has been made since a previous update to the parameter.

The invention extends to apparatus for processing a user input to a system comprising:
  receiving means configured to receive reflections of signals from a moving input object;
  feedback means configured to provide continual or continuous sensory feedback to the user, controlled by a parameter; and
  processing means configured to:
    repeatedly determine information relating to the direction of movement of the input object from said reflections;
    repeatedly determine information relating to the speed of the input object from said reflections; and
    repeatedly update the parameter by means of an algorithm that takes, as two variable inputs, the information relating to the direction of movement of the input object, and the information relating to the speed of the input object,
  wherein the processing means is further configured to apply a time-dependent change to the parameter when no new determination of information relating to the speed or direction of movement of the input object has been made since a previous update to the parameter.

The invention extends to a computer software product, and to a carrier bearing the same, configured, when run on an apparatus, to cause the apparatus to process a user input to a system, comprising:
  logic for processing received reflections of signals from a moving input object;
  logic for repeatedly determining information relating to the direction of movement of the input object from said reflections;
  logic for repeatedly determining information relating to the speed of the input object from said reflections;
  instructions for providing continual or continuous sensory feedback to the user, controlled by a parameter;
  logic for repeatedly updating the parameter by means of an algorithm that takes, as two variable inputs, the information relating to the direction of movement of the input object, and the information relating to the speed of the input object; and
  logic for applying a time-dependent change to the parameter when no new determination of information relating to the speed or direction of movement of the input object has been made since a previous update to the parameter.

The apparatus may be a computing device, such as a personal computer or a mobile telephone. The processing means may be logic within such a device, although it may comprise a remote server, or a combination of local and remote processors.

Thus it will be seen by those skilled in the art that, in accordance with the invention, the user does not have to wait until after he has performed a gesture in order to find out whether the gesture is being correctly made and recognised.

Instead, the user can receive continual or continuous feedback, even when the update rate of the positioning system is slow. This allows him/her to adjust the motion of the gesture mid-way through, e.g. if the feedback indicates an anomalous movement of the input object. For example, the user may be able to discern from the feedback if his/her gesture is deviating from its initial path, or if it is moving out of the optimal input zone. The present arrangement also provides reinforcement to the user that the system is receiving the input gesture while it is being performed, which encourages the user to continue the gesture and to use the system further.

The Applicant has determined that, surprisingly, such feedback can be generated using knowledge only of the direction and speed of the input object; i.e. without a need to have detailed information regarding the position of the input object. This stands in contrast to prior approaches of, say, moving a cursor in response to a sequence of detailed position coordinates for an input object. (The present invention may nonetheless also make use of position information, but this is not required.)

The Applicant has found however that in accordance with at least some embodiments of the invention, the result of the feedback is that the user is given the perception that movement of their hand or other input object is being directly tracked to give precise control over the input given to the system, despite the relatively cruder nature of the actual input. The ability to give a high quality user experience with more limited resources than would otherwise be presumed necessary is a significant advantage which embodiments of the invention can achieve.

Although appropriate to many input systems, the present invention is well suited for use with gesture-classifying input systems. In such environments, the direction and speed information may be determined only relatively infrequently, in order to reduce processing requirements. However by providing feedback continually or continuously, even during gaps in such information, consistent feedback is given to the user. This is accomplished by means of a time-dependent change to the parameter, which might, for example, be derived by extrapolating from recent values of the parameter. In this way, gaps or errors in the information relating to the speed or direction can be smoothed out, without interrupting the feedback, thereby avoiding confusing the user. The ability to cope with gaps or errors in the data is important, because these are common in touchless sensing systems. This contrasts with the situation one might expect to find in certain touch-based input systems (e.g. infrared touch screens), where gaps or errors in input data should be rare, and where precise, coordinate-based position information are likely to be readily available.

The signals may be electromagnetic, such as when using optical or RADAR positioning, but they are preferably acoustic. Acoustic signals travel much more slowly than electromagnetic signals, and are thus better suited to being processed to determine motion information on resource-constrained devices such as mobile telephones. Particularly preferably, the signals are ultrasonic since these are undetectable to the human user (i.e. having a frequency higher than the normal human hearing range; typically this means the signals have a frequency, or base or median frequency greater than 20 kHz, e.g. between 30 and 50 kHz or higher).

The signals may originate from an external source, but are preferably emitted from the apparatus itself. The apparatus may therefore comprise one or more signal transmitters, such as ultrasonic transmitters. It preferably comprises one or more signal receivers, such as ultrasonic microphones, which may be separate from any transmitters or may have some or all components in common therewith.

Any transmitted signal may be transmitted continuously or discretely. Signals may, for example, comprise a series of discrete, acoustic chirps, i.e. rising or falling tones. Reflections from different parts of the input object will be received at different times and may exhibit different characteristics; such differences may be used to distinguish the input object from other objects from which reflections of the signals are received. Techniques for motion-based input control are described in the applicant's earlier applications WO 2006/067436, WO 2009/122193 and WO 2009/115799, which are hereby incorporated by reference.

The information relating to the direction of movement of the input object may be determined at regular or irregular intervals. These intervals may correspond to the same rate at which discrete signals are transmitted from the apparatus, e.g. with one determination of direction being made for each transmitted signal, but this is not essential. In particular, noise and interference may be such that determinations of direction can only be made irregularly, once a sufficient quantity of data has been acquired from reflections for the estimate to satisfy a reliability criterion.

Similarly, the information relating to the speed of the input object may be determined at regular or irregular intervals, which may be the same as or different from the intervals at which the direction of movement information is determined.

The direction and speed information may be determined by any suitable means. However, in some embodiments, a matrix of impulse responses is defined, with impulse responses from adjacent time frames being adjacent each other in the matrix. The time frames may correspond to a pattern in transmitted signals. A set of line filters, as described in WO 2009/115799, may be applied to the matrix, each selecting for a particular direction, speed, or combination of direction and speed.

Additionally or alternatively, timing information from a plurality of channels may be used to determine speed and direction information. The channels may be defined by the use of respective transducers, which may be spatially separated such that each channel receives a distinct pattern of echoes when the input object moves. The apparatus may, for example, have one ultrasound transmitter and a plurality of ultrasound receivers, although other combinations are possible.

In one example, the apparatus receives reflections on each of a left channel and a right channel, where the left channel receives an earlier and relatively stronger signal compared with the right channel when the input object is to the left of a centre point of the apparatus, and where the right channel receives an earlier and relatively stronger signal when the object is nearer the right of the apparatus.

Direction and/or speed information may be inferred from the relative strengths and/or timings and/or other characteristics of signals received on different channel; e.g. from a comparison of the signals between a plurality of channels.

The speed and/or direction information will typically be fairly crude. The speed or direction information may be determined as one of a small number of discrete values or ranges; e.g. two, four, eight or sixteen possible values or ranges. For example, the direction information may be one of "up", "down", "left", "right", "towards" or "away", with reference to a surface of the apparatus, or some other reference point or frame. Alternatively, the direction information might be an angle or bearing, or angular range, optionally with a confidence interval or other measure of estimate accuracy.

The speed information may be a quantified speed estimate, as a value or range, or may be a selection from a predetermined group of speeds. For example, it might be one of "stationary", "slow" and "fast".

The direction and/or speed information may relate to the true motion of the input object in three dimensions, or may relate to a projection, such as onto a plane, or some other transformed or simplified representation of its motion. In one set of embodiments the direction and/or speed information is related to one or more linear sliders—which may be in mutually orthogonal directions but this is not essential. The object's movement may then be translated into a movement in one or more of the sliders. The sliders could be associated with different spatial zones or an algorithm could be employed to translate a given movement into movement of just one slider—e.g. that parallel with the largest component of the object's movement.

A plurality of speed estimates may be determined, all relating to a common instant or time period. For example, the estimates may be obtained by applying a plurality of different filters to the same received signals; or they may relate to signals received on respective channels. A probability or confidence measure may be determined for each estimate. The different estimates may be combined to determine a single speed estimate for the instant or time period; e.g. by weighting each with a respective probability or confidence measure and determining a mean or median value. In this way, it can be possible to obtain a more reliable and/or more accurate estimate.

A plurality of direction estimates may similarly be determined and/or combined.

The sensory feedback provided to the user may be of any type, including audible, visual or haptic. It may comprise a combination of such types. The feedback means may comprise a display screen, discrete lights, loudspeaker, motor, and/or any other suitable components. The feedback may be continuous or discrete. In either case, however, it is provided continually or continuously for a period. This period may be for as long as the input object is within a detection region, or for the duration of a single gesture input (i.e. from when the system determines the start of a gesture input until when it determines the end of the input).

In one set of embodiments, the sensory feedback comprises audible feedback. This feedback (or non-audible feedback) may comprise a repetitive component with the repetition rate controlled by the parameter. For example, the audible feedback may comprise a series of discrete sounds, such as clicks, occurring at a rate determined by the parameter or may comprise a continuous sound, the frequency or volume of which is controlled by the parameter.

In one example, clicks could be used to simulate the rotation of a wheel having a ratchet and pawl mechanism, with the rate of rotation being determined from the speed of motion of the input object. The simulated wheel may have angular momentum so that it continues "turning" at a first rate corresponding to a first speed of the input object, even if the speed of the input object slows to a second rate. The system may simulate friction or resistance in the motion of the wheel.

The sensory feedback may comprise visual feedback.

In one set of embodiments, the sensory feedback comprises controlling an arrangement of discrete lights so as to provide a moving spot, or region of relatively high brightness compared with another region of the arrangement. The parameter may then control the position and/or speed and/or direction of movement of the spot or region. The lights may, for example, be arranged in a line or rectangular grid.

The sensory feedback may comprise changing the output of an electronic display, which may be a component of the apparatus or physically separate. The parameter may then control the position and/or speed and/or direction of movement of one or more graphical elements on the display, such as an image or icon. In one set of embodiments, the apparatus is configured to display a picture, and the parameter affects movement of a displayed picture on the display surface, for example the speed with, and/or direction along, which the picture progressively disappears off an edge of the display surface.

The algorithm takes the information relating to the direction of movement of the input object and the information relating to the speed of the input object as inputs. The effect of the input on the graphical element is that it is moved in response to the movement of the input object and the effect of the feedback may be arranged such that the movement of the graphical element appears to have an inbuilt 'momentum' such that the movement continues even if the movement of the input object stops. However by relating the initial speed and direction of movement to the speed and direction of the input object's movement, the illusion can be created that the input object is directly driving the movement of the graphical element in a 'one-to-one relationship' without the need for the resources necessary for an actual direct tracking input.

The algorithm may additionally take information relating to the position of the input object as an input, but this is not required.

The algorithm may be stateless, such that the value of the updated parameter does not depend on the value of the parameter before the updating, or it may be stateful, so that the updated value does depend on the previous value.

The parameter may be multi-dimensional. For example, it may comprise a component that controls the position of a feedback element, such as a spot of light or a graphical display element, and a component that controls the speed or velocity of the feedback element. A feedback element may be an indicator that is used primarily for the purposes of providing feedback, such as a moving icon, or it may be a result or consequence of the function being performed. For example, if a user is scrolling through photographs on a digital photo frame, with only one or a subset of the photographs visible at a time, a left-to-right gesture of the hand in front of the display panel of the frame may cause a virtual ribbon of photographs to slide in the same direction. In this case, a photograph or the line of photographs may constitute the feedback element.

The apparatus may be configured to respond to a finite set of distinct input gestures. Methods of the invention may comprise detecting and identifying movement of the input object corresponding to a recognised input gesture, and responding thereto. A most likely one of the set of recognised gestures might be identified before the input gesture has been completed, e.g. based on the direction and/or speed of the input object instantaneously or historically, as being the most likely intended input gesture. The sensory feedback provided to the user may depend on the identity of this most likely gesture. The estimate of the most likely gesture may change during the course of the input, or it may remain fixed once determined.

The algorithm and feedback mechanism is preferably such that the speed of movement of a feedback element, or the rate/frequency etc of an audible feedback signal, is related to the speed of movement of the input object, for example, being the same, or a linear function thereof. It may be related to a component of the speed of the input object in a particular plane or direction, such as the direction of an allowed input gesture, e.g. a gesture that has been determined to be the most likely intended input gesture.

The algorithm and feedback mechanism may be such that the direction of movement of a feedback element is related to the direction of movement of the input object, for example, being in the same direction or at a predetermined angle thereto. However, in some preferred embodiments, the direction of movement of a feedback element is predominantly in the direction of an allowed input gesture. It might nonetheless react subordinately to the direction of movement of the input object. For example, the feedback element may have a limited freedom of movement in a direction orthogonal to the direction of an allowed input gesture, and may move thusly when a component of motion of the input object in such a direction is determined.

In some arrangements, it may be desirable that the repetition of a single gesture within a time period results in a different response by the system to the gesture being repeated outside the time period. More generally, the system's response to a gesture may depend on a system state which is determined by the relative timing and/or properties of an earlier gesture; e.g. such that a rapid repetition of a gesture has a different effect from the two gestures being more widely separated in time. Information relating to the value of the parameter during a first gesture may thus be used when controlling the value of the parameter during a second gesture. For example, if a certain gesture causes a virtual carousel of images to start spinning on a image displaying device, with the changing display constituting visual feedback according to the invention, repeating the gesture while the carousel is still spinning could result in the spinning continuing or even accelerating, which is different feedback from that resulting from the initial gesture. If the parameter relates to the rate of spinning of the carousel, the value may be maintained at a constant level, or altered by a time-related function, between the end of the first gesture and the start of the second. An example of this is consistent with the 'momentum' model discussed above. Each input from the user may be treated as an additional 'impulse' to increase the 'momentum' of the graphical element.

The algorithm may retard movement of the feedback element over time, e.g. by simulating a frictional force opposing continued movement of the feedback element. Such retarding may be applied continuously or only occasionally, such as when there is no movement of the input object within an input region.

In a set of embodiments movement of the feedback element may be retarded or retarded more quickly upon receipt of information relating to particular direction and/or speed of movement of the input object. Conveniently the direction of movement which causes such retardation is different, e.g. opposite, to that which gave rise to the initial movement of the feedback element. For example if a leftward sweep causes movement of the feedback element, a rightward sweep may be used to retard it—thus the opposite movement acts like a 'brake'. The degree of retardation is preferably related to the speed of the retarding movement. Movement of the input object above a threshold speed or movement in yet another direction (e.g. towards a display screen) may cause an abrupt stop in one example.

The algorithm may take as input a target position related to a display surface and may control the updating of the parameter so as to simulate an attractive (or repellent) force between the graphical display element and the target position. The system may comprise a physics engine that models forces between display elements. The target position may be a mathematical attractor for the algorithm.

A displayed graphical element may thus have certain "natural stopping points" resulting in a "snap-to-grid"-like behaviour. For instance, if a row of photos is displayed on a screen, there may be one or more natural points for these elements to "snap" to when they come to a halt, such that one photo is centrally located on the screen. Each graphical element may have a reference point, such as the centre of a photo, which can "snap" to any of the target positions on the display surface. This help the user to be less concerned with the accuracy of his/her hand motion as the movement should eventually result in the element coming to a halt in an appropriate positions—a "meaningful halt"; e.g. not in an in-between position where the elements (e.g. photos) are not in any natural or settled position (e.g. with one photo in the centre of the screen).

Although so far principally only information relating to the speed and direction of motion of the input object has been considered, methods of the invention may nonetheless also make use of information relating to the position of the input object. Such information may be determined from the said signal reflections.

The position determination may comprise determining whether the input object is within one of a plurality of predetermined zones or positional states. In contrast to known systems, it is envisaged that the position of the input object would typically be determined relatively crudely; for example, whether the object is in one of two, three, or four zones or positional states; and preferably no more than ten or a hundred zones or states.

If the apparatus comprises a display surface on which feedback may be presented, the position of the input object is preferably determined at a resolution at least one, two or three orders of magnitude poorer than the resolution of the display screen; i.e. it is determined to be in one of a number of positions or positional states where this number is at least ten, a hundred or a thousand times smaller than the number of pixels on the display, in total or along a particular axis.

Position information may be used to restrict the recognising of certain input patterns or gestures to predetermined spatial areas. For example, a top-to-bottom motion past an input surface, such as a display screen, might only be validly classified if the downward movement is initiated in the vicinity of the top of the surface.

Position information may be an integral part of the gesture-recognition system. For instance, as the system detects a first movement of the input object in a particular direction (e.g. leftwards), it can distinguish whether this happens on the left side or the right side of a reference area (such as a region in front of a display screen). If it occurs on the right side, the user may expect the gesture to result in the "pushing" of on-screen objects; i.e. accelerating them across the screen from right to left, and the system can be configured to provide this response. If, however, the leftwards motion were initiated on the left side of the screen (e.g. by a user inserting his hand into a sensing space in front of the screen by first moving it perpendicularly towards the screen, and then starting a leftwards motion), a "push" response is not intuitive and instead a "pulling" response would be required. Such an action may be undesirable from an interface-design perspective, and might therefore need to be excluded as an illegal input gesture. By excluding it, the user can learn that there is no invisible "string" between the hand and the on-screen object that could facilitate a "pull" motion. Such an arrangement also makes the system reasonably robust towards unintended gestures.

Use of the information relating to the position of the input object enables the system to make such distinctions in how it responds to a gesture.

Certain preferred embodiments of the invention will now be described, by way of example only, with reference to the accompanying drawings, in which.

Figure 1:
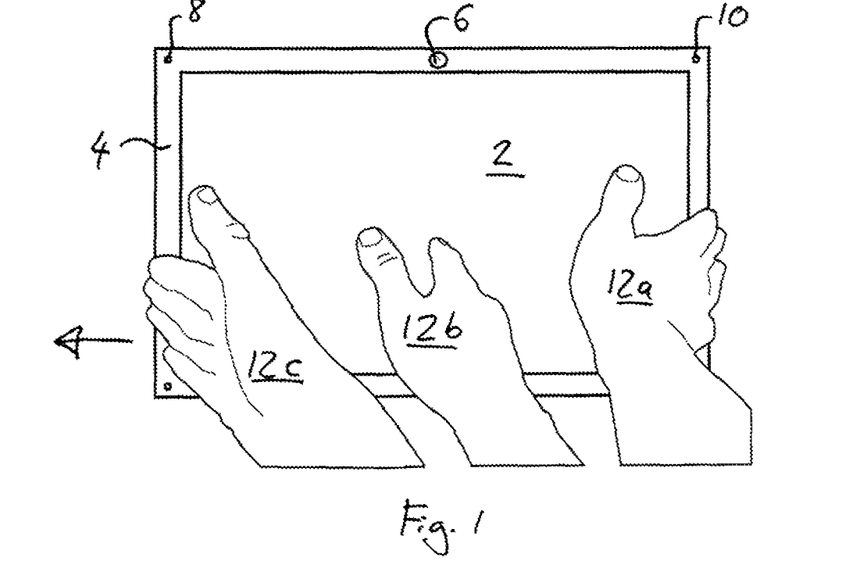
FIG. 1 is a figurative front projection of a display device embodying the invention showing a user interacting with the device.

FIG. 1 shows a display device having a flat-panel display screen 2 mounted vertically in a rectangular frame 4. Mounted centrally in the top beam of the frame 4 is an ultrasound transmitter 6. In the top-left corner of the frame 4 there is a left ultrasound receiver 8, while in the top-right corner of the frame 4 there is a right ultrasound receiver 10. Although only two receivers, or microphones, are shown, there may be more than this.

A user's hand 12 is shown in succession of time-separated positions 12a, 12b, 12c as it moves from right to left past the display 2, being first in front of the display 2 to the right, then central, and finally to the left.

The transmitter 6 emits a series of ultrasonic signals or a continuous, varying signal, which is reflected off the hand 12 when it is at the various positions 12a, 12b, 12c. The reflections are received and sampled using the ultrasound receivers 8, 10, each defining its own channel.

Although only three positions are shown, the signals are typically transmitted at a rate that is faster than just three samples in the time taken for such a gesture. Rather, there may typically be hundreds or thousands of samples taken during this time.

Figure 2:
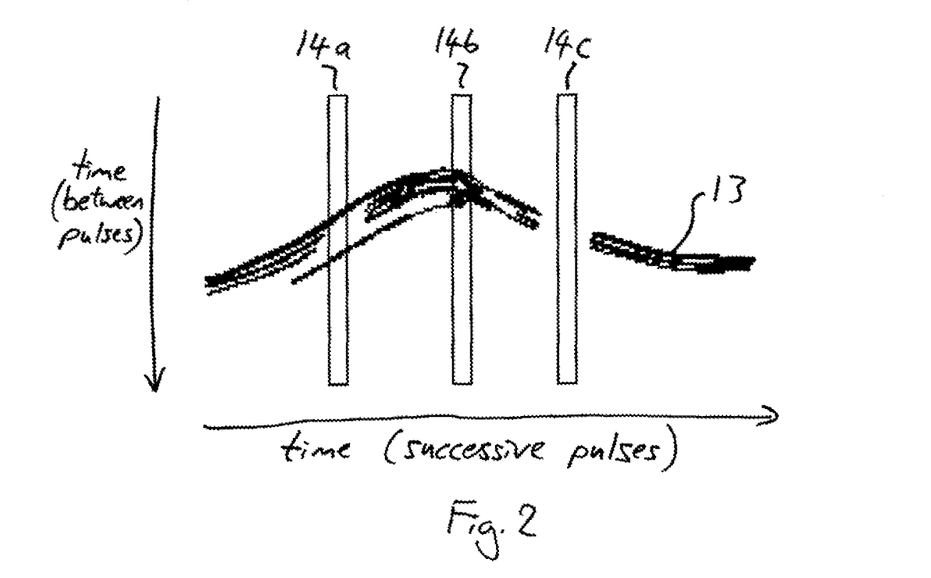
FIG. 2 is graph illustrating an impulse response image received on one channel of the display device.

FIG. 2 shows an observed impulse response image for the channel corresponding to the right receiver 10. The construction of such images is described in WO 2009/115799. Echoes from the hand 12 are contained in the broad line 13. Impulse response images are generated for the other channels, but these are not shown here. Information from impulse response images across several channels can be combined to detect and characterise aspects of the motion of the object.

There are many different ways in which the impulse response images can be analysed automatically to acquire information about the motion of an object in the imaging field. The use of line filters and edge filters for automatically interpreting relatively complex gestures using a simple energy pattern-matching algorithm is described in WO 2009/115799. The system may make use of a common velocity conjecture for the input object for each specific sensor channel I.e. the system guesses a velocity for the user's hand consistent with a previous trajectory and with physical rules, and converts this velocity conjecture into a set of line (or other) filters for each sensor channel.

When working with crude detection of inputs, difficult and complex signal observations can arise, for which no clear motion can be discerned, at least not for every range and for every part of the object. This is especially the case when the perspective view of the input object changes significantly throughout its motion. In such circumstances, it can be advantageous to use constant-false-alarm-rate (CFAR)-based edge filters in the impulse response images of each channel. The output of CFAR edge filters can form the input to filter-based processing referred to above, or to processing based on trend analysis and block matching. CFAR filters are described in "Statistical Signal Processing" by L. L. Scharf, chapters 4.9-4.12.

The CFAR filters are two-dimensional filter masks which are applied to the impulse response image, or preferably to the energy image, i.e. impulse response images with the phase information removed by using an envelope filter or by taking the absolute values of the pixels and smoothing the output results. The filters may typically be rather large, i.e. if the number of impulse response taps computed in the images is, say three-hundred, the two-dimensional CFAR filter masks may be of height 60 and width 11, having zero or negative entries above the edge diagonal and one values below it.

The CFAR filters may be skewed in accordance with their direction of focus, i.e. not having a square filter mask for every sought edge, but rather a parallely skewed mask in response to the direction of motion to be detected. This facilitates faster implementations of the filters using sliding-window techniques where the filter is slid over the response image, avoiding the need for extensive recalculation at each step. In practice, such filters can be realized effectively and in real-time on low-cost processors running at a few tens of megahertz, and with very low memory requirements.

The CFAR filter can be used to examine the presence of a known signal in unknown levels of noise. The known signal, or even a linear space of known signals, would here be a set of empirically-observed leading-edge signals, such an impulse response known to contain a clear reflection, plus other similar and possibly phase-shifted signals. These provide a low-dimensional space of signals known to exhibit desirable leading-edge characteristics.

The CFAR subspace filter then provides a statistical test to whether a given impulse response contains a leading edge or not. This technique is particularly beneficial when working with impulse response signals, since the vast dynamic range may require a large number of bits to represent, with both the least-significant bits (LSB) and the most-significant bits (MSB) carrying information. The total number of bits can be magnitudes larger than the bit-rate of the sampling system. Hence, precise, but sometimes highly fluctuating values, represent background noise and foreground objects, which makes it difficult to provide exact thresholds defining the foreground and background, as is customary in other fields, such as image processing.

The CFAR-filter, however, is invariant to scaling of the match signal; rather, it obtains a uniformly most powerful test limit for a given false-alarm probability, and its probability of misses is dependent only on the signal-to-noise ratio. Moreover the CFAR filter can be extended to work for multiple impulse responses (i.e. multiple time frames for a single channel), and using a 2D match filter mask, such as a line-filter, can provide even more robust detection of a leading edge.

By means of suitable processing, such as applying and testing filters to sets of received impulse responses, it is therefore possible to obtain information about the speed and/or direction of the user's hand 12. Information about its position may also be acquired.

In FIG. 2, the horizontal axis represents the time frame index. Thus, every "column" in the image corresponds to an impulse response generated during a specific time frame, with time running from top to bottom. The system may have a frame rate of 120 frames per second, meaning that 120 columns of impulse responses correspond to one second of gesture recording.

The column 14a in FIG. 2 corresponds approximately to the impulse received when the hand is in position 12a in FIG. 1, and similarly for 14b and 12b; and 14c and 12c. There are several gaps in the echo line 13, which is common in practice. This could be due to multiple reflections off different parts of the hand 12 overlapping and cancelling, or it could be due to just a small portion of the hand being visible to the transducer-pair 6, 10 defining the channel, or it could arise from external noise.

The perspective change of the hand relative to the transducers 6, 10 during the movement can cause the echo line 13 to fluctuate; i.e. the echo-profile of the hand can change its shape during the motion. Therefore, there will only be certain intervals during which the motion detection system built into the display device can reliably report on a motion trend. At these intervals or moments when the movement direction of the hand is sufficiently clearly seen by a sufficient number of channels, the tracking algorithm passes 'motion packets' to a graphical user interface system. The packets may only be generated or passed over when data derived from the reflections from one or more channels satisfies a quality criterion.

These motion packets may contain direction and/or speed and/or position information relating to the input object. They may be software objects that are passed through an application interface (API) between a motion input system and a graphical user interface system within the device.

When they are available, these motion packets are used by the graphical user interface system to update the movement of an on-screen object, such as a thumbnail of a photograph. However, these packets may only be generated erratically. In order to provide continuous feedback, a time-based function is used to generate feedback when no packets are available.

Figure 3:
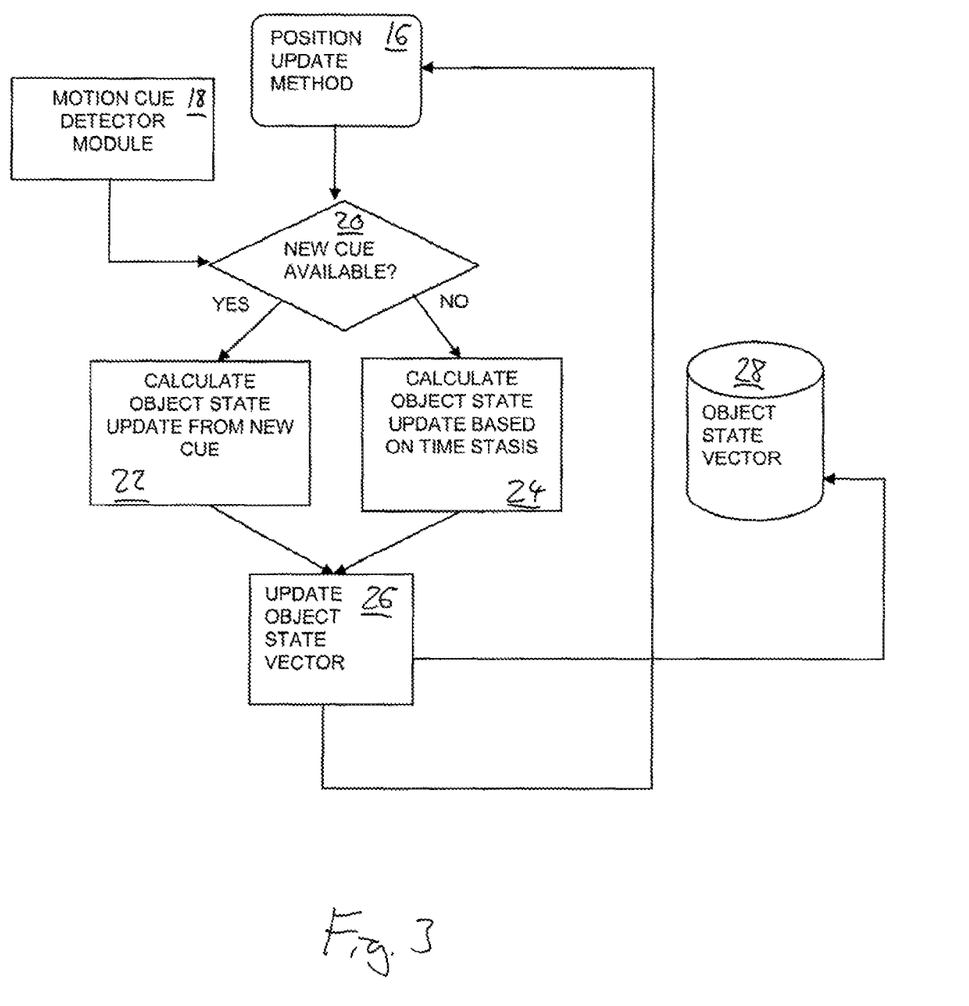
FIG. 3 is a flow chart showing internal operations of the display device.

FIG. 3 illustrates these internal operations of the device in more detail. The position update method 16 works as follows. When it has sufficient data to do so, a motion-cue detector module 18 generates motion packets or cues containing speed and/or direction information. This generation is effectively asynchronous, as it depends on real-world factors such as noise levels. The rest of the method is clocked and loops at an update rate. At the step 20, if a cue is available, an update of the object state is calculated 22 based on the cue. If a cue is not available, an update is computed based on some time-dependent parameter 24. In either case, the update is then used to modify 26 the object state vector held in memory 28. The process then loops back to the beginning.

A cue may only be made available when sufficiently-reliable estimates of both speed and direction are available, or these measurements may be treated independently, with the process described in FIG. 3 effectively being duplicated for each.

The result of the above is that in use a user may execute a movement over the screen which gives rise to objects on the screen moving with a direction and speed related to the direction and speed of the input movement. This has been found to give the strong impression that the hand movement is directly driving the display movement, thereby mimicking the behaviour of popular touch-screen devices, without the resources necessary for direct tracking in the touchless domain.

The invention claimed is:

1. A method of processing a user input to a system comprising:
receiving reflections of signals from a moving input object;
repeatedly determining information relating to the direction of movement of the input object from said reflections;
repeatedly determining information relating to the speed of the input object from said reflections;
providing continual or continuous sensory feedback to the user, controlled by a parameter;
repeatedly updating the parameter by means of an algorithm that takes, as two variable inputs, the information relating to the direction of movement of the input object, and the information relating to the speed of the input object; and
applying a time-dependent change to the parameter when no new determination of information relating to the speed or direction of movement of the input object has been made since a previous update to the parameter,
wherein the information relating to the direction of movement or speed of the input object is determined by applying a set of line filters to a matrix of impulse responses.

2. A method as claimed in claim 1 comprising applying the time-dependent change to the parameter by extrapolating from recent values of the parameter.

3. A method as claimed in claim 1 wherein the signals are ultrasonic.

4. A method as claimed in claim 1 comprising acquiring a sufficient quantity of data from the received reflections that the information relating to the direction of movement or speed of the input object satisfies a reliability criterion.

5. A method as claimed in claim 1 comprising determining the information relating to the direction of movement or speed of the input object from a characteristic of signals received on different channels.

6. A method as claimed in claim 5 wherein said characteristics relate to relative signal strength or to timing information for the signals received on the different channels.

7. A method as claimed in claim 1 comprising relating the information relating to the direction of movement or speed of the input object to one or more linear sliders and moving one or more of the sliders in response to movement of the input object.

8. A method as claimed in claim 1 comprising providing the sensory feedback to the user for as long as the input object is within a detection region.

9. A method as claimed in claim 1 wherein the sensory feedback comprises a repetitive component with the repetition rate controlled by the parameter.

10. A method as claimed in claim 1 wherein the sensory feedback comprises audible feedback.

11. A method as claimed in claim 1 wherein providing the sensory feedback comprises changing the output of an electronic display, wherein the parameter controls any one or more of the position, speed and direction of movement of a graphical element on the display.

12. A method as claimed in claim 11 comprising controlling the display of the graphical element so that the speed of movement of the graphical element is determined by a linear function of the speed of the input object.

13. A method as claimed in claim 11 comprising controlling the display of the graphical element so that the graphical element continues to move even after movement of the input object stops.

14. A method as claimed in claim 11 comprising controlling the display of the graphical element so that the graphical element moves in predominantly the direction of an allowed input gesture.

15. A method as claimed in claim 11 wherein the algorithm is such as to retard movement of the graphical element over time.

16. A method as claimed in claim 15 wherein the algorithm is such that the retardation is initiated or increased upon receipt of information indicating that the input object is moving in a particular direction or at a particular speed.

17. A method as claimed in claim 16 wherein the particular direction is different from the direction of movement of the input object that initiated the movement of the graphical element.

18. A method as claimed in claim 11 wherein the algorithm takes as input a target position related to the electronic display and is such that the updating of the parameter simulates an attractive or repellent force between the graphical display element and the target position.

19. A method as claimed in claim 1 comprising providing information relating to the position of the input object as input to the algorithm.

20. A method as claimed in claim 1 comprising determining whether the input object is within one of a plurality of predetermined zones or positional states.

21. A method as claimed in claim 1 comprising using information relating to the position of the input object so as only to respond to movement of the input object corresponding to an input pattern or gesture having an associated spatial area if the input object is located in that spatial area.

22. A method as claimed in claim 1 comprising detecting and identifying movement of the input object corresponding to a recognised input gesture, and responding to the input gesture.

23. A method as claimed in claim 22 comprising determining a most likely one of a set of recognised gestures and providing sensory feedback to the user based on the identity of the most likely gesture before the most likely gesture has been completed.

24. A method as claimed in claim 1 comprising detecting an input gesture from information relating to movement of the input object and providing a first response if an input gesture is repeated within a period of time, and providing a second, different response if the input gesture is repeated after an interval longer than the period of time.

25. A method as claimed in claim 1 comprising using information relating to the value of the parameter during a first gesture of the input object when determining the value of the parameter during a second gesture of the input object.

26. Apparatus for processing a user input to a system comprising:
- a receiving arrangement configured to receive reflections of signals from a moving input object;
- a feedback arrangement configured to provide continual or continuous sensory feedback to the user, controlled by a parameter; and
- a processing arrangement configured to:
  - repeatedly determine information relating to the direction of movement of the input object from said reflections;
  - repeatedly determine information relating to the speed of the input object from said reflections; and
  - repeatedly update the parameter by means of an algorithm that takes, as two variable inputs, the information relating to the direction of movement of the input object, and the information relating to the speed of the input object,
- wherein the processing arrangement is further configured to apply a time-dependent change to the parameter when no new determination of information relating to the speed or direction of movement of the input object has been made since a previous update to the parameter, and the information relating to the direction of movement or speed of the input object is determined by applying a set of line filters to a matrix of impulse responses.

27. A non-transitory computer program product, comprising a computer usable medium having a computer readable program code when run on an apparatus, to cause the apparatus to process a user input to a system, comprising:
- logic for processing received reflections of signals from a moving input object; logic for repeatedly determining information relating to the direction of movement of the input object from said reflections;
- logic for repeatedly determining information relating to the speed of the input object from said reflections;
- instructions for providing continual or continuous sensory feedback to the user, controlled by a parameter;
- logic for repeatedly updating the parameter by means of an algorithm that takes, as two variable inputs, the information relating to the direction of movement of the input object, and the information relating to the speed of the input object; and
- logic for applying a time-dependent change to the parameter when no new determination of information relating to the speed or direction of movement of the input object has been made since a previous update to the parameter,
- wherein the information relating to the direction of movement or speed of the input object is determined by applying a set of line filters to a matrix of impulse responses.

* * * * *